Sept. 27, 1955     E. P. TURNER ET AL     2,718,945
ELECTRIC CLUTCH-BRAKE MOTOR CONTROLS
Filed July 15, 1954     2 Sheets-Sheet 1

INVENTORS
Edgar P. Turner
BY Lorenz A. Wendel
ATTORNEY

WITNESS

Sept. 27, 1955     E. P. TURNER ET AL     2,718,945
ELECTRIC CLUTCH-BRAKE MOTOR CONTROLS
Filed July 15, 1954     2 Sheets-Sheet 2

INVENTORS
Edgar P. Turner
BY Lorenz A. Wendel

WITNESS

ATTORNEY

United States Patent Office 2,718,945
Patented Sept. 27, 1955

2,718,945
ELECTRIC CLUTCH-BRAKE MOTOR CONTROLS

Edgar P. Turner, Watchung, and Lorenz A. Wendel, Somerville, N. J., assignors to The Singer Manufacturing Company, Elizabeth, N. J., a corporation of New Jersey Application July 15, 1954, Serial No. 443,612

4 Claims. (Cl. 192—18)

This invention relates to electric-clutch brake motors or power transmitters and, more specifically, relates to an improved clutch and brake actuating means and has for an object the provision of a push-pull rod actuating mechanism for the transmitter which is simple and inexpensive in its construction.

Figure 1:
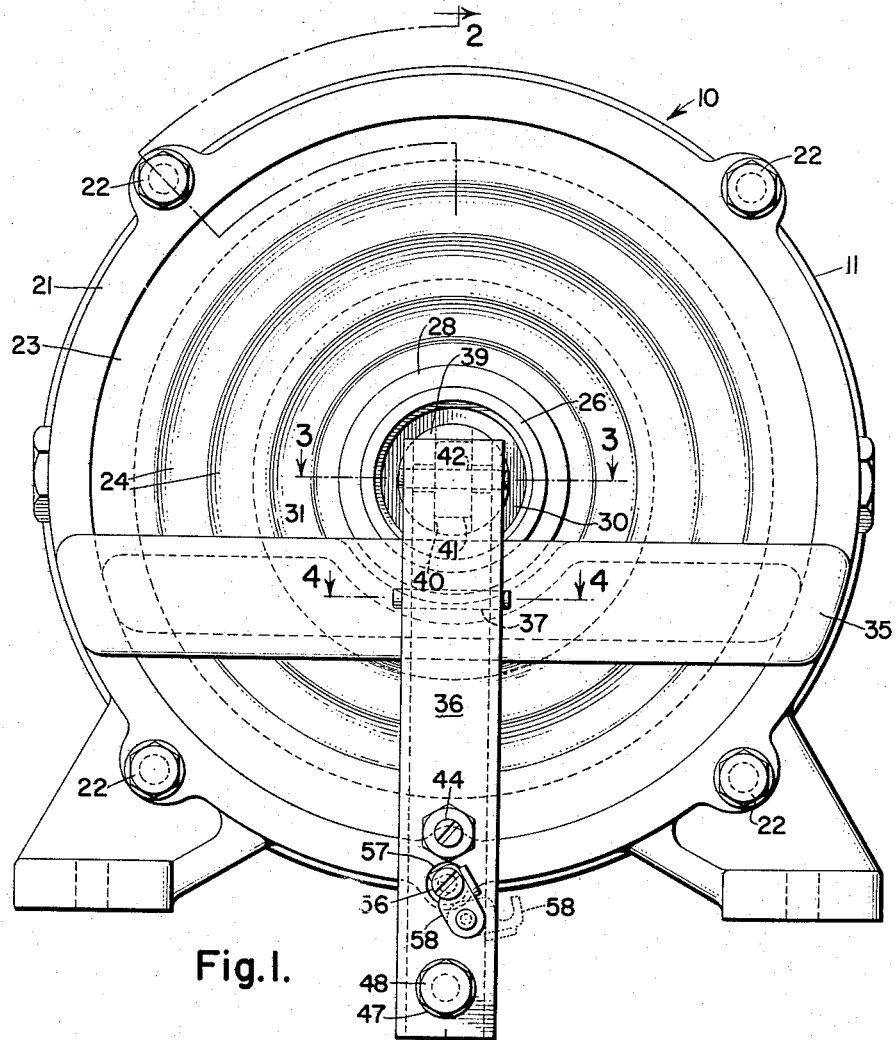
Fig. 1 is an end view in elevation of an electric power transmitter embodying the invention.
Figure 3:
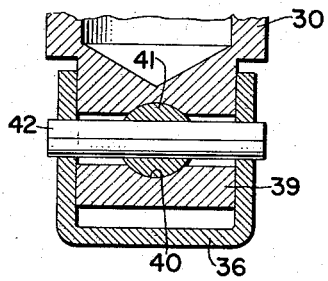
Fig. 3 is a sectional view taken on line 3—3 of Fig. 1.
Figure 4:
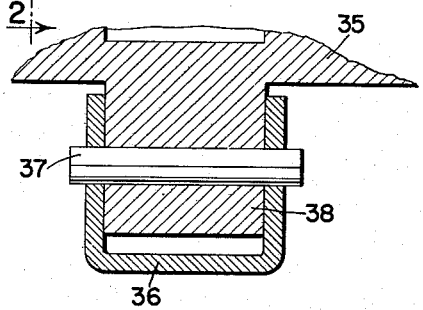
Fig. 4 is a sectional view taken on line 4—4 of Fig. 1.

Referring more particularly to the drawings, an electric clutch-brake motor or power transmitter 10 is shown which comprises a bell-shaped casing or frame 11 provided with a tubular rotor support 12 extending into the interior of the casing 11. A sleeve shaft 14 is rotatably supported on two ball bearings 15 and 16 mounted in the tubular support 12 and carries a motor rotor 17, which is securely fastened to the sleeve shaft 14. A motor stator 18 is rigidly fastened to the outside of the support 12 concentric with the rotor 17. A brake ring 19 is spaced from the open end of the frame 11 by suitable shims 20. A clamping ring 21 is drawn against the brake ring 19 by four cap screws 22 which pass through the brake ring 19 and are threaded into the frame 11. The outer edge of a flexible diaphragm 23 is clamped securely between the brake ring 19 and the clamping ring 21 and the diaphragm 23 is provided with concentric annular corrugations 24. A central opening in the diaphragm 23 receives a control bearing cup 25 provided with a reduced diameter portion 26 and a shoulder 27. A clamping ring 28, press-fitted on the reduced diameter portion 26, holds the inner edge of the diaphragm firmly against the shoulder 27. The bearing cup 25 carries a ball bearing 29 which is held in place by a control cap 30 and a snap ring 31. The bearing 29 rotatably supports one end of a driven shaft 32 disposed concentric with the rotor 17 and a snap ring 33 holds the bearing against a shoulder on the driven shaft 32 to prevent relative axial movement between the shaft 32 and the bearing 29. The other end of the driven shaft 32 is supported for both rotary and axial movement in a roller bearing 34 carried by the frame 11. The end of the shaft 32 adjacent to the roller bearing 34 is provided with a tapered portion to receive a driven element such as a gear or pulley (not shown). A fulcrum bar 35 carried by the clamping ring 21 supports an actuating lever 36 which is pivotally connected to the fulcrum bar 35 by means of a pivot pin 37 passing through a boss 38 on the bar 35 and through the sides of the lever 36. The upper end of the lever 36 embraces a journal block 39 formed on the control cap 30. A vertical hole 40 is provided in the journal block 39 in which a trunnion block 41 operates. A pin 42 pivotally fastens the lever 36 to the trunnion block 41 and passes through clearance holes in the journal block 39. The lower end of the lever 36 is spring-biased toward the frame 11 by a coil tension spring 43, one end of which is secured to the frame clamping ring 21 and the other end of which is secured to a tension adjusting screw 44 threaded into the lever 36. A control rod 45 extends through a hole 46 in the bottom of the lever 36 and carries a centering washer 47 and adjusting nut 48. A coil compression spring 49 surrounds the rod 45 and is confined between the lever 36 and an adjustable spring anchor 50. The rod 45 controls axial movement of the driven shaft 32 which carries a friction disc 51 secured against both axial and rotary motion relative to the driven shaft 32. The disc 51 carries a friction clutch facing 52 on one side adapted to engage a clutch surface 53 and a brake friction facing 54 on the other side adapted to engage the brake ring 19. A stop device is provided to prevent accidental engagement of the clutch which comprises a stop screw 55 threaded into the clamping ring 21, the head 56 of which protrudes through a hole 57 in the actuating lever 36. A latch 58 is pivotally fastened to the lever 36 and is arranged to latch under the head 56 of the stop screw 55 to prevent the lever 36 from passing over the head 56 of the screw 55.

Figure 2:
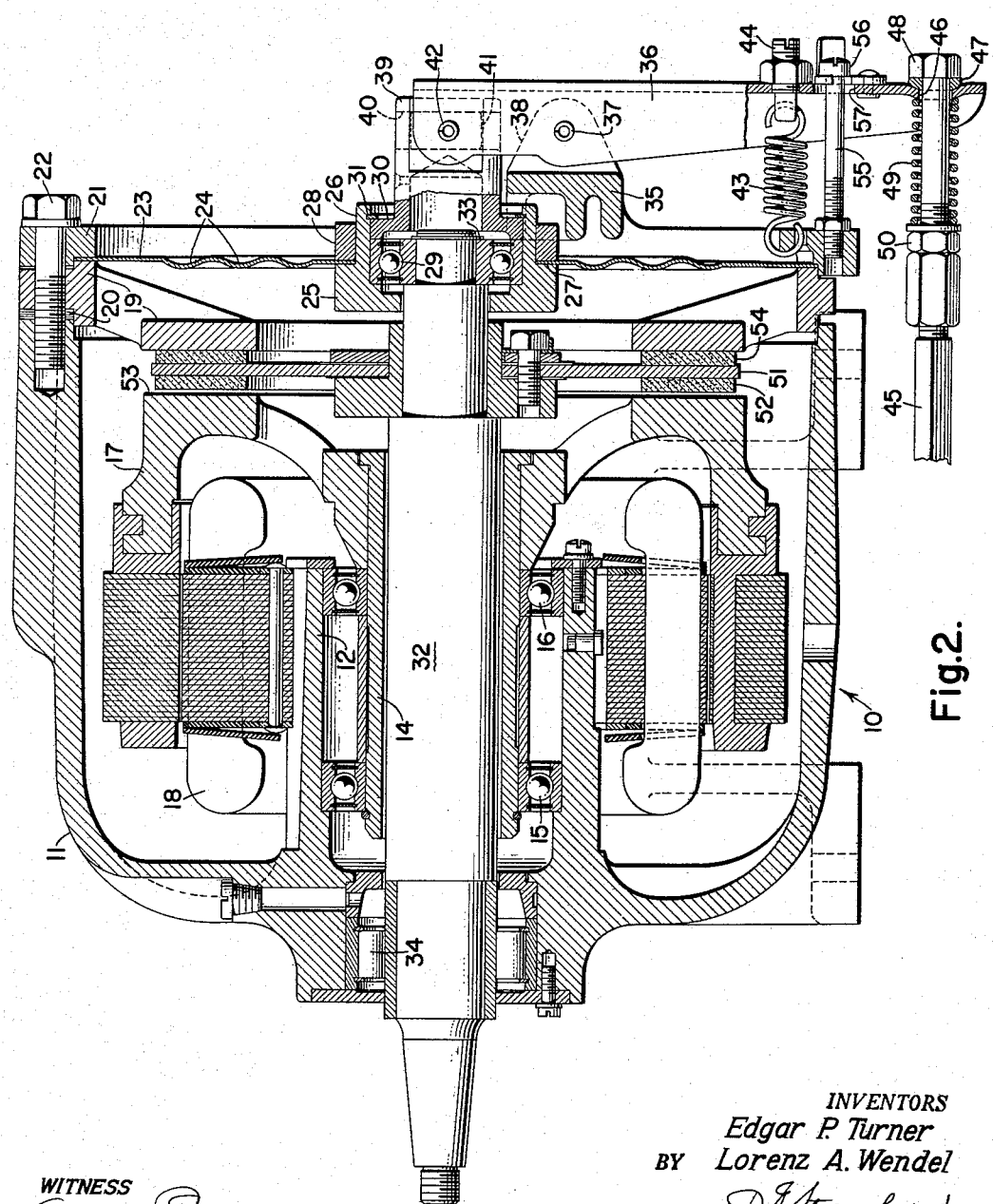
Fig. 2 is a sectional view taken substantially one line 2—2 of Fig. 1.

In view of the foregoing description it is believed that the operation and advantages of the invention will now be readily understood. The diaphragm 23 is made from thin sheet metal or similar material which is strong in shear but yet flexible. In addition to its flexibility, the diaphragm 23 has a tendency, when flexed, to return to its unflexed position. This feature causes the diaphragm 23 to act as a return spring. When the transmitter 10 is manufactured the parts are made and assembled so that, at rest, the various parts are in substantially the position shown in Fig. 2 having the brake facing 54 engaging the brake ring 19 with the diaphragm 23 substantially unflexed. To engage the transmitter clutch, the latch 58 is moved to the dotted line position of Fig. 1 and the control rod 45 is moved to the right in Fig. 2, which is opposite to the clutch-engaging movement for most prior transmitters. The rod 45 moves the spring anchor 50 against the relatively stiff spring 49 which forces the lever 36 to pivot about the fulcrum pin 37. As the lever 36 moves, it moves the driven shaft 32 to the left until the clutch facing 52 firmly engages the clutch surface 53. Of course, it will be appreciated that the spring 49 is strong enough to overcome the resistance of the diaphragm 23 to flexing. If an overload is placed on the control rod 45 after the clutch is engaged, the spring 49 yields and the rod 45 moves through the hole in the lever without damaging any of the parts. This provides a simple and compact overload protection device for the clutch mechanism.

In order to release the clutch and engage the brake, the force for moving the control rod is removed, permitting the brake spring 43 to pull the lower end of the lever 36 toward the frame 11. As the lever 36 moves, it carries the driven shaft 32 to the right as viewed in Fig. 2 to disengage the clutch facing 52 from the clutch surface 53 and engage the brake facing 54 with the brake ring 19. Of course, the diaphragm 23 in returning to its unflexed position assists the spring 43 in this operation, thus permitting use of a lighter brake spring 43 than would otherwise be required as well as a lighter overload spring 49.

Occasionally it is necessary to adjust or service the mechanism (not shown) driven by the transmitter 10. During the time of adjustment or repairs, it is desirable that means be provided which will prevent accidental engagement of the transmitter clutch. The stop screw 55 and latch 58 provide such a device. With the transmitter parts in the position shown in full lines in Figs. 1 and 2 the brake is shown as being engaged and the latch 58 is shown under the head 56 of the stop screw 55. Under these conditions, when the control rod 45 is moved to engage the clutch as described above, the head 56 of the stop screw 55 is held by the latch and cannot pass through the hole in the actuating lever 36. When the stop screw 55 is properly adjusted, the lever 36 is stopped before the clutch facing 52 moves far enough to engage the clutch surface 53 on the rotor 17.

It is believed that the advantages of the invention are now apparent. The transmitter is compact and efficient and very simple in construction. Further, the actuating mechanism permits actuation of the transmitter by moving the control rod in directions which are reversed from those used in a conventional transmitter. The disclosed construction also permits the use of lighter brake and overload springs than used in a conventional transmitter resulting in easier operation of the controls.

Having thus set forth the nature of the invention, what we claim herein is:

1. An electric clutch-brake motor comprising a frame, a motor stator and a motor rotor carried by said frame, a rotatable and axially movable driven shaft concentric with said rotor and having one end rotatably supported by said frame, connecting means actuated by axial movement of said shaft for operatively connecting said driven shaft to said rotor, a flexible diaphragm carried by said frame, a bearing carried by said diaphragm and rotatably supporting the other end of said shaft, means fixing said bearing against axial movement relative to said diaphragm and said shaft, an actuating lever for flexing said diaphragm and moving said shaft axially, a fulcrum for said actuating lever carried by said frame, a spring carried by said frame and urging one end of said lever toward said frame, an actuating rod operatively connected to said one end of said lever, and a yielding overload connection between said rod and said lever.

2. An electric clutch-brake motor as claimed in claim 1 comprising a stop carried by said frame, a latch carried by said lever and engageable with said stop to limit the movement of said lever.

3. An electric clutch-brake motor comprising a frame, a motor stator and a motor rotor carried by said frame, a rotatable and axially movable driven shaft concentric with said rotor and having one end rotatably supported by said frame, connecting means actuated by axial movement of said shaft for operatively connecting said driven shaft to said rotor, a flexible diaphragm carried by said frame, a bearing carried by said diaphragm and rotatably supporting the other end of said shaft, means fixing said bearing against axial movement relative to said diaphragm and said shaft, an actuating lever for flexing said diaphragm and moving said shaft axially, a fulcrum for said actuating lever carried by said frame, a spring carried by said frame and urging one end of said lever toward said frame, an actuating rod operatively connected to said one end of said lever, a spring anchor carried by said rod, and a spring disposed between and engaging said spring anchor and said actuating lever forming a yieldable overload connection.

4. An electric clutch-brake motor comprising a frame, a motor stator and a motor rotor carried by said frame, a rotatable and axially movable driven shaft concentric with said rotor and having one end rotatably supported by said frame, connecting means actuated by axial movement of said shaft for operatively connecting said driven shaft to said rotor, a flexible diaphragm carried by said frame, a bearing carried by said diaphragm and rotatably supporting the other end of said shaft, means fixing said bearing against axial movement relative to said diaphragm and said shaft, a clamping ring secured to said frame and securing said diaphragm in place, a fulcrum bar carried by said ring, an actuating lever pivotally connected to said fulcrum bar for flexing said diaphragm and moving said shaft axially, means operatively connecting one end of said lever to said shaft, a spring carried by said frame and urging the other end of said lever toward said frame, an actuating rod for moving said lever toward and away from said frame, and a yieldable overload spring connection between said rod and said lever for one direction of movement.

References Cited in the file of this patent

UNITED STATES PATENTS

| 1,695,230 | Curtis | Dec. 11, 1928 |
| 2,521,638 | Lamm | Sept. 5, 1950 |
| 2,646,520 | Labastie | July 21, 1953 |

FOREIGN PATENTS

| 619,966 | Great Britain | Mar. 17, 1949 |
| 708,437 | Great Britain | May 5, 1954 |